United States Patent [19]

Shimada

[11] Patent Number: 4,845,661
[45] Date of Patent: Jul. 4, 1989

[54] DISPLAY INFORMATION PROCESSING APPARATUS

[75] Inventor: Yasuhei Shimada, Tokyo, Japan
[73] Assignee: NEC Corporation, Tokyo, Japan
[21] Appl. No.: 897,898
[22] Filed: Aug. 19, 1986
[30] Foreign Application Priority Data
Aug. 19, 1985 [JP] Japan .................................. 60-182341
[51] Int. Cl.⁴ ............................................. G06F 3/14
[52] U.S. Cl. .................. 364/900; 364/927.2; 364/939.3; 364/939.8
[58] Field of Search ... 364/200 MS File, 900 MS File
[56] References Cited
U.S. PATENT DOCUMENTS

| 3,818,461 | 6/1974 | Ward et al. | 364/900 |
| 4,075,695 | 2/1978 | Lelke | 364/200 |
| 4,434,472 | 2/1984 | Kachun | 364/900 |
| 4,435,792 | 3/1984 | Bechtolsheim | 365/230 |
| 4,689,741 | 8/1987 | Redwine et al. | 364/200 |

Primary Examiner—Gareth D. Shaw
Assistant Examiner—Christina M. Eakman
Attorney, Agent, or Firm—Sughrue, Mion, Zinn, Macpeak & Seas

[57] ABSTRACT

A display information processing apparatus includes a central processing unit, a dual port memory including a first storage area and a second storage area, a display address generator, a timing signal generator and a control circuit and operates such that operation of the central processing unit is stopped only when data is transferred from the first storage area to the second storage area within the dual port memory. Data to be displayed is transferred only from the second storage area to a display device.

8 Claims, 2 Drawing Sheets

DISPLAY INFORMATION PROCESSING APPARATUS

BACKGROUND OF THE INVENTION

The present invention relates to an information processing apparatus and, particularly, to a display information processing apparatus which includes a display circuit for displaying characters and/or graphics.

PRIOR ART

A conventional display information processing apparatus of this type has an access cycle in which a central processing unit (CPU) accessess a display memory (video memory) for reading operation and writing operations, and a display cycle in which display data is readout from the display memory and is displayed on a screen. Since it is necessary to periodically send the display data to the display device, the access cycle may be restricted to achieve the purpose.

One conventional approach to avoid such a limitation is to divide the display memory into a plurality of block portions and have the CPU alternatively access these block portions. In this approach, however, at least two buses are needed because a CPU bus must be provided separate from a display bus, and as a result the circuit becomes complex and construction becomes expensive.

In another approach, the display cycle and the access cycle are time-shared. For operational efficiency, synchronization of the access cycle with the display cycle using a common clock signal is generally desired. In this system design, however, the frequency of the clock signal for the CPU is limited by the display timing. That is, when the display timing is satisfied, the operation speed of the CPU is limited, and when a clock with a high frequency is used, the display timing could not satisfy the requirements for a system such as NTSC or PAL.

Another approach is to use a dual port memory containing two independent memory areas, each of which is accessed by the same address. In this approach, the CPU can access the memory at a high speed. However, the number of memory cells of the memory is at least twice that of the usual memory and thus such dual port memory is very expensive.

In still another approach, display data read out from a display memory is stored in a first-in first-out (FIFO) memory and the display memory is accessed by the CPU while the display data in the FIFO is sent to the display device. The access to the display memory is performed without wait-time of the CPU.

An example of a conventional apparatus for processing display information according to the last approach is shown in block diagram in FIG. 1.

In FIG. 1, a central processing unit (CPU) 31 accesses a video RAM 33 using a CPU address bus 41 and a CPU data bus 42. The video RAM 33 is usually isolated from the CPU buses 41 and 42 by a bus switching circuit 32 and a bus switching control circuit 34. The control circuit 34 feeds a switching control signal to the bus switching circuit 32 to connect the buses 41 and 42 to RAM 33 only when the CPU 31 accesses the video RAM 33 to perform a read/write operation. The bus switching circuit 32 responds to another switching control signal from the bus switching control circuit 34 to isolate the CPU address and data buses 41 and 42 from the RAM 33 and to connect a display address bus 43 and data. That is, the CPU address and data buses 41 and 42 are paired and the display address and data buses 43 and 44 are also paired, and switching between the pairs is controlled by the switching control signal from the switching control circuit 34 as shown by dotted lines in the bus switching circuit 32.

When the video RAM 33 is isolated from the CPU address and data buses 41 and 42, a display address counter 35 provides a display address to the video RAM 33 and data to be displayed is read out from the video RAM 33 and is supplied to a first-in first-out (FIFO) memory 36. The FIFO memory 36 outputs data in the same order as data is inputted and an output of the FIFO memory is supplied to a character generator 39. A timing generator 37 supplies a timing signal to the FIFO memory 36, and the character generator 39 to assure that the display data is sent to a display device (CRT) 48 as data 45, and supplies a synchronizing signal 46 to the CRT 48 to display the data 45 on the screen.

A wait managing circuit 38 monitors the amount of display data in the FIFO memory 36 by means of a wait column number signal 47. When the amount of the display data in the FIFO 36 is small, the ranging circuit 38 supplies a display readout control signal to the display address counter 35 to generate a readout cycle of the video RAM 33 so that the FIFO memory 36 is filled with display data. The number of wait columns at which the operation for increasing the wait column number in the FIFO memory 36 commences is assumed as a first value. Further, the wait managing circuit 38 provides a switch prohibition signal to the buse switching control circuit 34 when the FIFO memory 36 contains no display data in order to stop the operation of the CPU 31 when the CPU 31 provides an access demand to the video RAM 33.

A command interpretation circuit 49 is connected to the CPU 31 and the bus switching circuit 32 through the CPU data bus 42 and monitors commands to be executed by the CPU 31. When the CPU 31 executes a command which requires access to the video RAM 33, the command interpretation circuit 49 supplies a video RAM priority demand signal to the wait managing circuit 38. Upon reception of this signal, the wait managing circuit 38 checks the timing of the access of CPU 31 to the video RAM 33 and for the possibility of the disappearance of display data in the FIFO memory 36 within read/write time of the video RAM 33. When the possibility is negative, the wait managing circuit 38 prohibits provision of the readout control signal even if the number of wait columns is not more than the first value. The number of wait columns at this time is assumed as a second value. The bus switching control circuit 34 checks the state of the CPU 31 at the time of the CPU 31 access to the video RAM 33. When the video RAM 33 is in the read/write state, the bus switching control circuit 34 supplies a switching control signal to the bus switching circuit 32, in order to switch the buses so that the CPU 31 can access the video RAM 33. After the access of the CPU 31 to the video RAM 33 is completed, the provision of the readout control signal is enabled. In the case where the video RAM priority demand signal is produced and the CPU 31 does not access the video RAM 33 at a predetermined timing, the wait managing circuit 38 monitors the number of wait columns and returns to producing the readout control signal. In a case where the amount of display data in the FIFO memory 36 is consumed during an access operation of the CPU 31 to the video RAM 33, while the video priority demand signal is being supplied to the wait managing circuit 38, a switching prohibition signal is sent to the bus switching control circuit 34 as was the casee where the FIFO memory 36 was emptied so that, when the CPU 31 provides an access demand for the video RAM 33, the operation of the CPU 31 is stopped and instead, the readout control signal is produced to fill up the FIFO memory 36 with display data.

In the conventional system mentioned above, the number of display cycles for inputting display data to the FIFO memory 36 per unit time is reduced when the access of the CPU 31 to the display memory is relatively frequent, and, ultimately, there is no time retained to transfer the display memory bus to the CPU. Therefore, it becomes necessary to stop the CPU operation and give priority to the display bus cycle. That is, the information processing speed of this system is lowered when the CPU frequently accesses the display memory. Further, the FIFO memory and other circuits of this system are usually complicated and expensive.

As mentioned, the operation speed of the respective conventional display information processing apparatuses is slow and/or the systems themselves are much too expensive.

SUMMARY OF THE INVENTION

An object of the present invention is to provide a display information processing apparatus which eliminates the disadvantages inherent to the conventional apparatuses.

According to the present invention, a display information processing apparatus comprises a central processing unit (CPU) for executing a program, a dual port memory including a first storage area which is accessed by the CPU, and a second storage area for storing at least one data to be transferred to a display device as display data, a display address generator for generating a display address where data to be transferred to the second storage area is stored, a data transfer signal generator for generating a data transfer signal to indicate data transfer from the first storage area to the second storage area in the dual port memory, and a control circuit which inhibits memory access by the CPU only when data in the first storage area is transferred to the second storage area. Data to be displayed is derived only from the second storage area in the memory.

In the display information processing system of the present invention, the CPU is stopped only when it accesses the dual port memory during the data transfer cycle. With this construction, the CPU can access the dual port memory without wait time at any time other than during the data transfer cycle and thus the operational efficiency of the CPU is considerably improved.

DESCRIPTION OF THE PREFERRED EMBODIMENT

Figure 2:
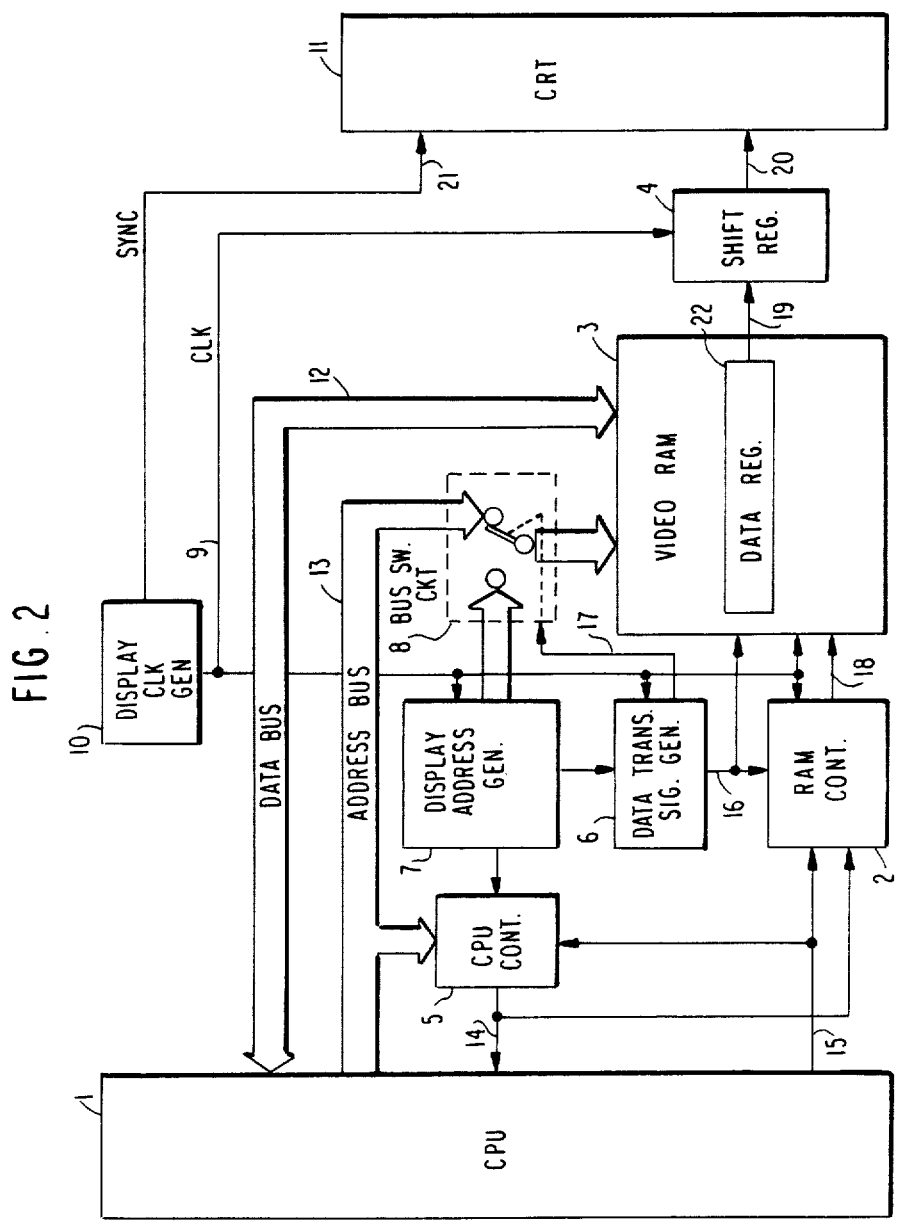
FIG. 2 is a block diagram of an embodiment of a display information processing apparatus according to the present invention.

Describing the present invention with reference to FIG. 2, a central processing unit (CPU) 1 produces data to be displayed according to a display program and can accesses a data transfer type dual port video RAM 3 by using a data bus 12 and an address bus 13 which is connectable to the RAM 3 through a bus switching circuit 8.

The bus switching circuit 8 connects, operatively, the CPU 1 to the dual port video RAM 3 so that the CPU 1 can access the RAM 3 in the same manner as the usual video memory when the address bus 13 is connected to the RAM 3. The content of a data register 22 in the dual port video RAM 3 is derived through a serial read port 19 in synchronism with a display clock signal 9 produced by a display clock generator circuit 10 and is supplied to a shift register 4 for parallel/serial conversion. The shift register 4 outputs an image signal 20 to a display device (CRT) 11.

The CPU address bus 13 is connected to the RAM 3 in an initial state and when the data register 22 is storing data to be displayed. The CPU 1 can access an arbitrary address of the RAM 3 to write data to be displayed or to read out data stored in the RAM, except for that in the data register 22, for modification.

A data transfer signal generator circuit 6 counts timing signals from a display address generator circuit 7 as the amount of data stored in the data register 22 included in the dual port video RAM 3 decreases and sends a bus switching signal for connecting the display address generator 7 to the RAM 3 via the bus switching circuit 8 immediately before the register 22 is empty. The bus switching circuit 8 responds to the bus switching signal 17 by switching the address bus. The display address generator circuit 7 generates a sequential address and supplies it subsequently through the bus switching circuit 8 to the dual port video RAM 3. The data transfer signal generator 6 sends a data transfer signal 16 to the dual port video RAM 3 to indicate a data transfer to the data register 22. Further, this transfer signal 16 is also sent to RAM control circuit 2 at the same timing. The RAM control circuit 2 responds to the data transfer signal 16 by producing a RAM control strobe signal 18 which is supplied to the dual port RAM 3. In response to the signals 16 and 18, data in the RAM, which is designated by the address generated from the display address generator 7, is transferred to and stored in the data register 22. The display address generator 7 is connected to the RAM 3 only in this data transfer cycle.

A CPU control circuit 5 checks the state of CPU 1 when the timing signal is generated by the display address generator 7 before the data transfer cycle. When the state of CPU 1 shows that the CPU 1 wants to access the dual port video RAM 3 which is about to perform a data transfer cycle, the CPU control circuit 5 sends a CPU stop signal 14 to the CPU 1 to stop its operation. The CPU control circuit 5 simultaneously sends the CPU stop signal 14 to the RAM control circuit 2 to inhibit a control signal 15 from the CPU 1. Thus, the data transfer cycle is executed with a higher priority than that of the CPU access cycle and, after the transfer cycle is completed, the CPU stop signal 14 is removed.

The display clock generator circuit 10 produces the display clock signal 9 which is supplied to the display address generator circuit 7, the data transfer signal generator circuit 6, the RAM control circuit 2, the dual port video RAM 3, the shift register 4 and other circuits which operate in synchronism with the display timing. The display clock generator circuit 10 also produces a synchronizing signal 21 which is supplied to the CRT 11.

It should be noted at this time that the shift register 4 can be omitted when the number of output terminals of the dual port RAM 3 equals the number of signals to be supplied to the CRT 11.

Figure 1:
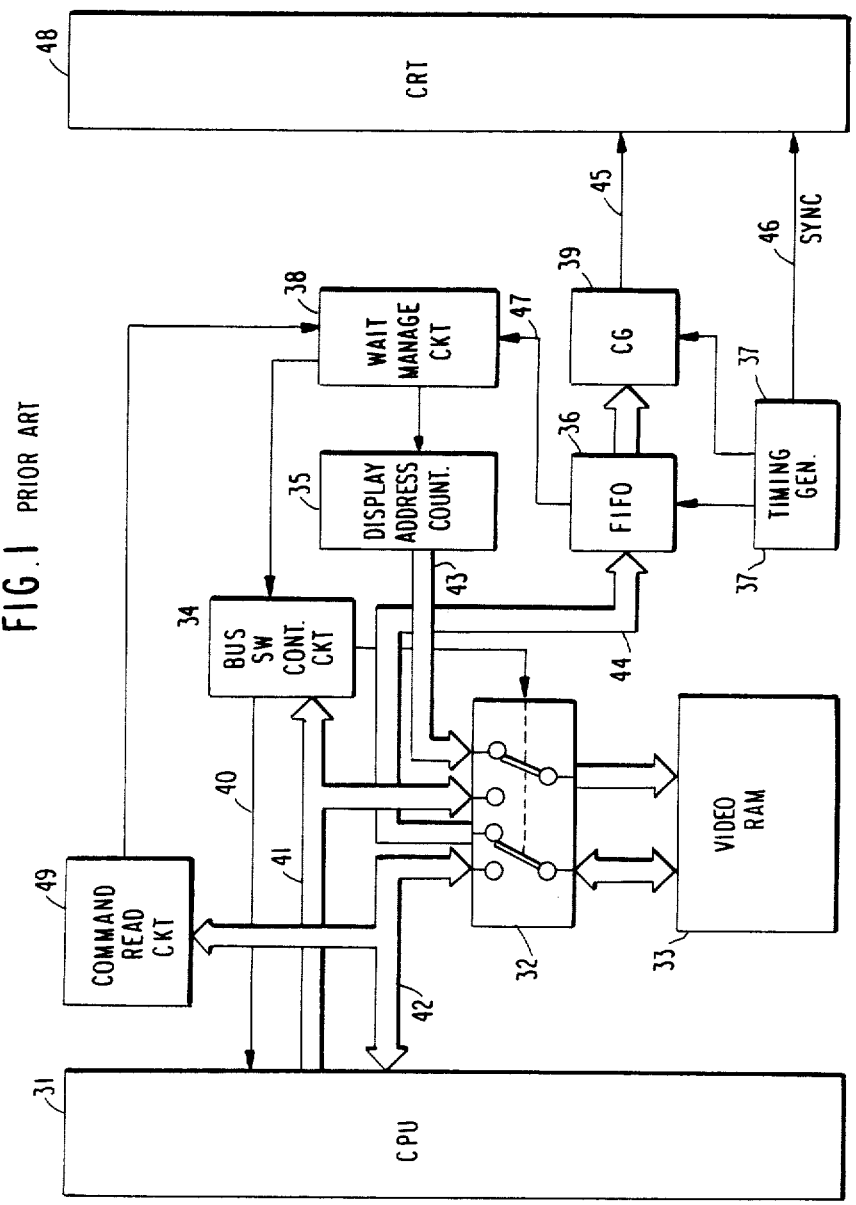
FIG. 1 is a block diagram of a conventional display information processing apparatus.

In this embodiment, a well known bit map display method may be provided in which data in the dual port video RAM 3 is used as the display data without charge. When the data in the RAM 3 is a character code, the character generator 39 shown in FIG. 1 may be arranged between the dual port video RAM 3 and the shift register 4 for a code-pattern conversion. The dual port video RAM 3 may be used as a host memory for storing not only the display data, but also commands and/or data of the CPU 1. The CPU control circuit 5 may be omitted when it is desired to simplify the circuit construction even if the efficiency of the CPU is lowered to some extent. In such case, the CPU stop signal 14 may be substituted by the data transfer signal 16.

When operation of the system with the display clock is defined synchronized with the CPU clock, the display clock generator circuit 10 may be removed so that the CRT 11 is operated with the CPU clock.

Although the display device 11 is described as a CRT, it does not have to be a CRT, and other devices such as liquid crystal displays (LCD), fluorescent display tubes, electroluminescence displays or plasma displays may be used instead.

Ths bus switching circuit 8 may be removed when the address is not time-shared.

As described, according to the present invention, the operation of the CPU is stopped only during the data transfer cycle when the data is transferred from the memory cells of the dual port memory to the data register. Therefore, the CPU can access the dual port memory without wait time during any time other than the time for the data transfer cycle and, thus, the efficiency of the CPU is extremely improved.

For example, in the case where the memory 3 is a 256K bit dyanmic RAM with 256 column addresses and 1024 row addresses, when a memory cell is to be assigned, the 1024 bits of data selected by one of the 256 column addresses is readout in parallel and passed through a sense amplifier and a comparator and then only the assigned data, e.g. 4 bits or 8 bits is outputted by a row decoder.

In the case of the data transfer type dual port memory, data corresponding to the 1024 bit row addresses are stored in the data register during the data transfer cycle. Then, the data is derived therefrom with the display clock in a manner similar to the case of the FIFO memory. Therefore, when the data register has a 1024 bit × 1 bit construction and a 1-pin output terminal, it is necessary to produce a data transfer cycle every time 1024 bits are outputted as display data. Similarly, when the data register has a 256 bit × 4 bit construction and has a 4-pin output terminal, it is necessary to produce a data transfer cycle every time it is required to display 256 bits.

That is, the CPU can access, without wait time, the dual port memory during any time other than the data transfer cycle time which occurs once each time 1024 bit or 256 bit blocks are to be displayed. Further, since the possibility of accessing the CPU at the timing of the data transfer is further reduced, it is possible to operate the CPU with an efficiency of nearly 100%.

The operation clock of the CPU may be synchronized with the display clock. Thus, the required control circuit can become simplified in construction. Further, since the usual dynamic memory is constructed to readout data corresponding to row addresses in parallel, a data register and a data selector can be incorporated in the data transfer type dual port memory without substantial difficulty and, therefore, it is possible to construct the data transfer type dual port memory at a reduced cost compared with a complete dual port memory having a pair of memory cell circuits. Additionally, the display clock can be used independently from the CPU clock, so that the efficiency of the CPU becomes very high with minimum cost.

What is claimed is:

1. A display information processing apparatus, comprising:
    a central processing unit for producing a plurality of display data to be displaced according to a display program and address data associated with said display data;
    a dual port memory having a first storage area for storing data produced by said central processing unit, and a second storage area for holding at least one unit of data to be displayed, said unit of data being transferred from said first storage area during a data transfer cycle, said first storage area being operatively coupled to said central processing unit, said second storage area being coupled to a display device;
    a display address generator circuit for generating a display address separately from said address data produced by said central processing unit;
    an address control circuit coupled to said central processing unit and said display address generator circuit for selectively supplying one of said display address and said address data supplied from said central processing unit to said first storage area of said dual port memory;
    a timing generator for generating a timing signal for transferring the data from a location of said first storage area designated by said display address to said second storage area, said unit of data being composed of a plurality of segment data;
    serial read means coupled to said second storage area for sequentially reading one at a time each said segment data of said unit of data held in said second storage area;
    means for supplying the read-out segment data to a display device;
    a transfer control circuit coupled to said address control circuit and said timing generator for controlling said address control circuit to supply said display address generated by said display address generator to said first storage area for designating the location of the unit of data to be transferred to said second storage area, at a timing immediately before the data in said second storage area is empty, said transfer control circuit controlling said timing generator to generate said timing signal and to send said timing signal to said dual port memory for performing said data transfer cycle in said memory and for transferring the unit of data from said first storage area to said second storage area; and
    an access control circuit for controlling said address control circuit to supply said address from said central processing unit to said first storage area and for enabling writing or reading of data from or to said central processing unit to or from such address of said first storage area that is supplied from said central processing unit when the unit of data stored in said second storage area is sequentially read out from said second storage area, the supply of said address from said central processing unit to said first storage area being prohibited when the unit of data stored in said first storage area at the location designated by said display address is transferred to said second storage area during said data transfer cycle, whereby a desired address of said first storage area is accessible by said central processing unit during an optical period other than said data transfer cycle.

2. An apparatus as claimed in claim 1, wherein the capacity of said second storage area is smaller than that of said first storage area.

3. An apparatus as claimed in claim 1, wherein said central processing unit is coupled to said first storage area by an address bus and a data bus, said control circuit including means for decoupling the address bus from said dual port memory when data is transferred from said first storage area to said second storage area.

4. An apparatus as claimed in claim 1, wherein said display address generator circuit generates said display address sequentially and supplies said display address to said dual port memory.

5. A display information processing apparatus, comprising:
   a processing unit producing a plurality of display data to be displayed on a display and address data associated therewith;
   a memory containing a first storage area and a second storage area, said second storage area storing a unit of data composed of a plurality of segment data, said first storage area storing a plurality of units of data;
   means for sequentially reading, one at a time, each of said segment data stored in said second storage area;
   means for applying the read-put segment data from said second storage area to said display device;
   a data bus coupling said processing unit to said first storage area in said memory;
   a switching circuit coupled to said first storage area;
   an address bus coupled between said processing unit and said switching circuit;
   a display address generator for generating a display address that is independent of said address data produced by said central processing unit and which designates a storage location of one of said plurality of units of data in which data to be displayed is stored, and being coupled to said switching circuit; said switching circuit having a first state to transfer to said first storage area an address on said address bus designating a location of one of said plurality of units of data in said first storage area, to store data on said data bus in said first storage area in the location designated by said address on said address bus, said switching circuit having a second state to transfer said display generated from said display address generator to said first storage area; and
   a switching control circuit coupled to said display address generator, said switching circuit and said memory, said switching control circuit placing said switching circuit in said second state to couple said display address generator to said memory for applying said display address to said first storage area in said memory from said display address generator and for applying a data transfer signal to said memory to transfer data in said first storage area to said second storage area, said switching control circuit placing said switching circuit in said first state to decouple said display address generator from said memory and to couple said address bus to said memory when data in said first storage area is not to be transferred to said second storage area, and data in said second storage area being transferred to the display device when said address bus is coupled to said memory via said switching circuit, wherein said data on said data bus is written to said first storage area at said location determined by said address data on said address bus while said plurality of segment data are sequentially read from said second storage area while said switching circuit is in said first state.

6. An apparatus as claimed in claim 5, wherein said sequentially reading means includes a shift register for parallel/series conversion and for outputting an image signal to said display device, said shift register receiving as input data the output of said second storage area.

7. An apparatus as claimed in claim 5, further comprising:
   a processing unit controller coupled to said processing unit and said switch control circuit for checking the state of said processing unit prior to data transfer from said first storage area to said second storage area, and for transmitting a stop signal to said processing unit to prevent processing unit access to said memory during said data transfer.

8. An apparatus as claimed in claim 7, further comprising:
   a memory controller for producing a memory control signal and supplying said memory control signal to said memory so that said data transfer may be effected, said memory controller receiving as inputs said stop signal from said processing unit controller, and a control signal from said processing unit.

* * * * *

UNITED STATES PATENT AND TRADEMARK OFFICE
CERTIFICATE OF CORRECTION

PATENT NO. : 4,845,661

DATED : JULY 4, 1989

INVENTOR(S) : SHIMADA

It is certified that error appears in the above-identified patent and that said Letters Patent is hereby corrected as shown below:

Column 1, line 68, after "data" insert --44--.

Column 3, line 4, delete "casee" and insert --case--.

Signed and Sealed this

Seventh Day of August, 1990

Attest:

HARRY F. MANBECK, JR.

Attesting Officer

Commissioner of Patents and Trademarks